July 6, 1943. W. VAN B. ROBERTS 2,323,679
SIGNALLING SYSTEM
Filed Oct. 29, 1941
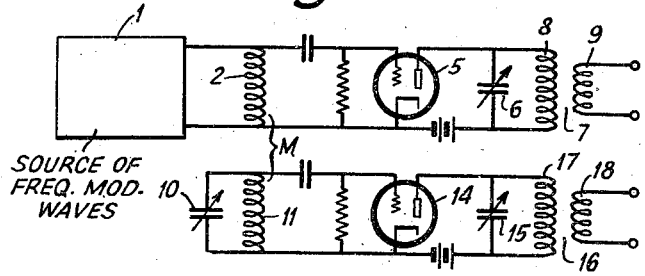
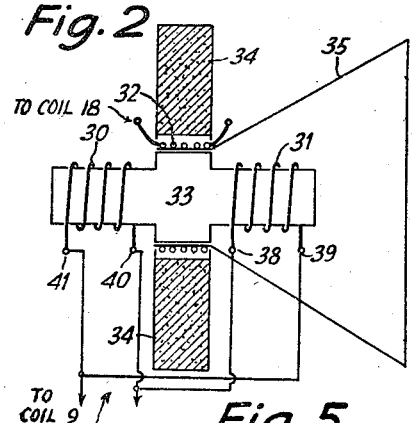
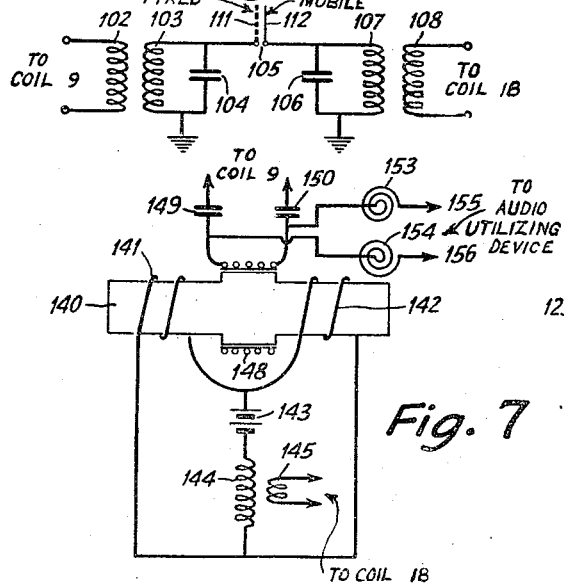
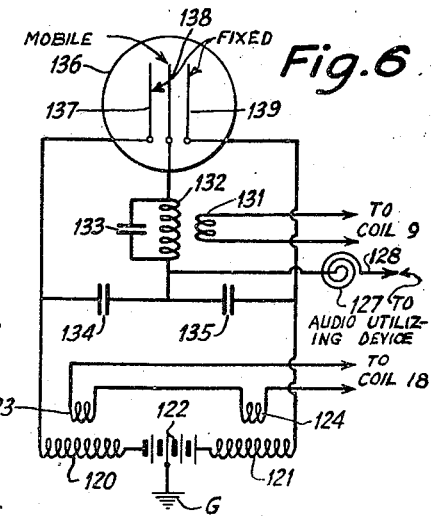
INVENTOR
WALTER VAN B. ROBERTS
BY H. S. Grover
ATTORNEY Patented July 6, 1943

2,323,679

UNITED STATES PATENT OFFICE 2,323,679

SIGNALING SYSTEM

Walter van B. Roberts, Princeton, N. J., assignor to Radio Corporation of America, a corporation of Delaware Application October 29, 1941, Serial No. 416,951

14 Claims. (Cl. 250—20)

The present invention relates generally to frequency modulation signaling systems and more particularly to arrangements for detecting frequency modulated waves.

It is an object of the present invention to provide means for converting frequency modulated waves directly into acoustical energy without requiring the use of conventional detectors and/or audio frequency amplifiers.

Another object of the invention is to provide means for producing audio voltages directly from frequency modulated waves.

A further object of the invention is to utilize a sound reproducer as a means for detecting frequency modulated waves.

These and other objects of the invention will become apparent upon reading the following specification in conjunction with the accompanying drawing which illustrates diagrammatically several forms which the invention may take.

The broad objects of my invention are attained by a process which is subsequent to receiving and amplifying frequency modulated waves and, if desired, converting the amplified energy to a predetermined mean frequency by the superheterodyne method, and also, if desired, subjecting the energy to frequency division for the purpose of reducing frequency swing.

For example, the incoming signals may be converted to an intermediate frequency in the usual fashion and the resulting intermediate frequency voltage after amplification may be used to control the frequency of an oscillator to lock it in step with a sub-multiple of the intermediate frequency. The output of this frequency divider may then be impressed upon a circuit which includes a phase shifting arrangement and which produces from the energy impressed thereon two different energies having the same frequency characteristics but a phase relation which varies from quadrature phase relation in accordance with deviations of the received energy from a predetermined frequency (preferably the mean frequency). The two energies are then combined to produce energy which is substantially proportional to the mean value of the scalar product of the two combined energies. By scalar product is meant the product of the magnitudes of the two currents or voltages (heretofore referred to as energies) multiplied by the cosine of the phase difference between them.

In one form of the invention these two energies are combined in a suitable field coil system wherein one of the energies is used to produce a radio field which cuts a movable coil through which flows the other energy. Such an arrangement produces an average force on the moving coil which is proportional to the frequency deviation of the received frequency modulated wave. The movements of the moving coil due to this force are utilized in one form of the invention to drive a loudspeaker cone to thereby produce acoustical energy directly. In another form of the invention, the movements of the moving coil are utilized to produce audio frequency voltages corresponding to said movements which voltages may be suitably amplified, if desired, and utilized in any suitable manner such as to drive a conventional loudspeaker.

In another form of the invention, the two produced energies are combined electrostatically. In this form of the invention one of the energies is used to produce an electrostatic field between two fixed plates while the other energy is impressed upon a movable plate or diaphragm which is mounted between the fixed plates. Thus, there is exerted upon the movable diaphragm or plate a mechanical force which is proportional to frequency deviations of the received wave from a predetermined frequency. Here again, the movable diaphragm may be constructed so as to radiate acoustical energy directly or it may be used to drive a radiator such as the diaphragm of a conventional loudspeaker. Also, movements of the diaphragm may be used to produce audio frequency voltages which may be amplified, if desired, and utilized in any suitable manner such as for driving a conventional loudspeaker.

In general, the two produced energies may be applied to any device whose output is proportional to the product of two input vector quantities.

Other forms and types of devices utilizing the two energies are shown and described herein. It is believed that still other forms and types thereof will be suggested to those skilled in the art without departing from the spirit of my invention.

Referring more particularly to the drawing:

Figure 1 illustrates in schematic form a circuit arrangement for producing the two energies heretofore noted through the use of a phase shifting device;

Figure 2 is a schematic showing of a field coil system to which the energies produced in the system shown in Figure 1 may be fed;

Figure 3 is a diagrammatic representation of an electrostatic device for deriving the signals from the two energies produced in a system such as shown in Figure 1;

Figure 4 illustrates a simplified detecting arrangement using two pancake type coils;

Figure 5 illustrates an arrangement for producing a mechanical force varying with modulation of a received frequency modulated wave;

Figure 6 is a diagrammatic showing of an electrostatic arrangement such as shown in Figure 3 but wherein audio frequency voltages are produced; and, Figure 7 is a diagrammatic illustration of an arrangement somewhat similar to the arrangement shown in Figure 2 except that in this arrangement audio frequency voltages are produced.

Referring more particularly to Figure 1 of the drawing, 1 represents any suitable source of frequency modulated waves such as, for instance, the preliminary circuits of a frequency modulation receiver. A coil 2 is connected across the source 1 so that frequency modulated energy from source 1 is available across the coil 2. The energy across coil 2 is impressed upon the input of an electronic tube 5. The output of tube 5 is impressed across a resonant circuit including the primary 8 of an output transformer 7 shunted by a tuning condenser 6. Resonant circuit 6, 8 is preferably tuned to the mean frequency of the energy impressed upon the input of the tube 5. Energy across the coil 2 is also impressed upon a resonant circuit including a coil 11 and a tuning condenser 10 through mutual inductance between coils 2 and 11. Resonant circuit 10, 11 forms the input circuit of a second tube 14 the output circuit of which includes a tuned circuit comprising a primary 17 of a transformer 16 shunted by a variable condenser 15. This last mentioned tuned circuit is also preferably tuned to the mean frequency. The constants of the various circuit elements associated with tubes 5 and 14 are preferably similar.

When circuit 10, 11 is tuned to the mean frequency of the energy impressed upon coil 2, the voltage across the tuned circuit 10, 11 will be shifted 90 degrees from the voltage across coil 2. Hence, the two tubes 5 and 14 have their grids excited in quadrature phase relation and since the circuit constants of the two tubes are substantially the same, the outputs of the two tubes are also in quadrature phase relation.

The operation of the invention is based upon the fact that frequency deviation from the mean frequency causes a phase departure from the quadrature condition relating the voltage of tank circuit 15, 17 with that of tank circuit 6, 8. This phase departure is substantially proportional to frequency deviation over a considerable range of frequencies. Accordingly, the device shown in Figure 1 produces from received frequency modulated energy two frequency modulated energies, one available across winding 9 and the other available across winding 18, having the same frequency characteristics but a phase relation which varies from quadrature phase relation in accordance with deviations of the received energy from a predetermined frequency (preferably the mean frequency of the incoming energy).

Various devices for utilizing these two energies are shown in Figures 2 through 7. In each of Figs. 2 to 7 input coils are represented. Each input coil is to be connected to a corresponding one of the two coils 9 or 18 of Fig. 1. The input coils of Figs. 2 to 7 bear legends to indicate the respective coil 19 or coil 18 of Fig. 1 to which a particular input coil is connected.

In the arrangement shown in Figure 2 there is provided a magnetic circuit including a core 33 (preferably composed of finely divided ferromagnetic material) having two leg portions and a central portion, and an annular ring 34 (preferably of the same material as core 33) which is mounted over the central portion of the core 33 and substantially coaxial therewith. The central opening in the annular ring 34 is made larger than the diameter of the portion of core 33 over which the ring is mounted so as to provide an air gap between the annular ring 34 and the central portion of core 33.

An axially movable cone structure 35 terminating at its small end in a cylindrical portion, is mounted in coaxial relation with core 33 and so that its cylindrical portion is situated within the gap formed between annular ring 34 and the central portion of core 33. The cylindrical portion of the cone structure acts as a support for a coil 32, the coil 32 being wound around the cylindrical portion of the cone structure and fixed thereto whereby movements of the coil are imparted to the cone structure. A pair of coils 30 and 31 are mounted on the core 33, one wound around one of the legs of core 33 and the other around the other leg of the core. It can be seen that the device shown in Figure 2 is essentially a loudspeaker wherein coil 32 corresponds to the ordinary voice coil and coils 30 and 31 correspond to the field coil of such a loudspeaker and cone 35 acts as the sound radiator. Energy passing through coils 30 and 31 in the proper relative directions produces a radial magnetic field which cuts the moving coil 32.

In the operation of the arrangement shown in Figure 2, terminals 38 and 40 are connected together and terminals 39 and 41 are connected together and coils 30 and 31 are energized by connecting one of the windings 9 and 18 (Figure 1) across the two resulting terminals. Winding 32 is energized by connecting it across the other one of windings 9 and 18.

Core 33 and annular ring 34 which together form the magnetic circuit of the device shown in Figure 2 are preferably composed of powdered iron which is sufficiently finely divided to avoid undesirable losses at the frequencies of operation. When a device such as that shown in Figure 2 has impressed upon it the two energies produced by a device such as that shown in Figure 1, there will be in addition to radio frequency variation of force on the moving coil 32, a force proportional to the frequency deviation of the frequency modulated wave from the mean frequency so that moving coil 32 may actuate cone structure 35 and thereby produce sound waves. The force on moving coil 32 is substantially proportional to the sine of the phase shift from the quadrature relation between the current in coil 32 and the magnetic field so that over a considerable range of frequency deviation, the force is proportional to deviation.

An electrostatically driven device for utilizing the two energies produced by an arrangement such as that shown in Figure 1 is illustrated in Figure 3 wherein one of the energies is impressed push-pull fashion upon two spaced fixed open-work electrodes 50 and 51 and the other energy is impressed upon a movable electrode or diaphragm 52 which is interposed between electrodes 50 and 51. The energy is impressed upon electrodes 50 and 51 through a transformer having a primary winding 56 and a secondary winding 55, the secondary winding being connected between electrodes 50 and 51 and having a center tap which is connected to diaphragm 52 through the secondary winding 53 of a second transformer having a primary winding 54. Primary winding 56 is symmetrically arranged with respect to the center tap of the secondary winding 55. Connection of winding 56 across one of the windings 9 and 18 (see Figure 1) produces an electrostatic field between the two electrodes 50 and 51 which acts upon the movable diaphragm 52. As a consequence, if voltage from the other tank circuit of Figure 1 is impressed across winding 54 by connection of winding 54 to the other one of the windings 9 and 18, there is set up a mechanical force on the movable diaphragm 52 which is proportional to frequency deviation over a range of frequencies so that the diaphragm 52 radiates sound waves corresponding to the signals. It is preferable to tune windings 53 and 55 to the mean frequency. For this purpose, winding 53 is shunted by a tuning condenser 57 and winding 55 is shunted by a tuning condenser 58.

In both Figures 2 and 3, a balance of forces is utilized, however, this is not absolutely necessary. For example, it is possible to produce the desired effects by means of a single pair of pancake coils 90, 91 (see Figure 4 wherein these coils are shown as spirals) which are arranged to attract each other in proportion to the product of the currents flowing therethrough. Thus, if coil 90 is energized by connection thereof across one of the windings 9 and 18 shown in Figure 1 and coil 91 is energized by connection thereof to the other winding 9 and 18, then the mechanical force between the coils 90, 91 will have a component of the modulation frequency. Similarly, as shown in Figure 5, if energy from one of the tank circuits of Figure 1 is impressed upon a fixed plate 111 through an appropriately tuned circuit 103, 104 and energy from the other tank circuit is impressed upon a movable plate 112 through appropriately tuned circuit 106, 107 and if the voltages on the two plates are in quadrature phase of the mean frequency there will be a mechanical force varying with modulation of the frequency modulated wave between plates 111 and 112 thereby causing a displacement of plate 112 with respect to plate 111. In Figure 5 the voltage from one of the tank circuits shown in Figure 1 may be impressed upon coil 103 by connection of winding 102 which is coupled to winding 103, across the appropriate one of windings 9 and 18 while the voltage from the other tank circuit of Figure 1 may be impressed across terminals upon coil 107 which is in coupling relation with coil 108 by connecting winding 108 across the other one of windings 9 and 18. In both of the arrangements shown in Figures 4 and 6 the force described will result in sound radiation, if the movable element is of the nature of a diaphragm.

As shown in Figure 4, the methods of the invention may be used to generate audio frequency voltage for amplification purposes or other purposes as desired.

Figure 6 illustrates a modification of the arrangement shown in Figure 3 adapted to generate audio frequency voltage.

In Figure 6, electrodes 137, 138 and 139 correspond respectively to electrodes 50, 52 and 51 of Figure 3. However, since no sound is believed to be radiated by electrode 138 which is the movable electrode, the three electrodes 137, 138 and 139 may be enclosed within an evacuated vessel 136 in order to provide better insulation between them. Windings 131, 132 of Figure 6 correspond to windings 54 and 53 respectively of Figure 3 and it is to be understood that the winding 131 is to be connected across one of the windings 9 and 18 of Figure 1. Windings 120 and 121 in series (Figure 6) correspond to winding 55 of Figure 3. However, in Figure 6 a source of direct current 122, an intermediate point of which is grounded as shown at G, is inserted between the open ends of windings 120 and 121. In order to provide a balanced coupling between the other one of the windings 9 and 18 of Figure 1 and windings 120 and 121, the primary winding is made up of two sections 123 and 124 coupled respectively to windings 120 and 121. Due to the insertion of battery 122 in the device shown in Figure 6, there is available between the lower end of coil 132 and ground, an audio frequency voltage which may be impressed upon any suitable device. For this purpose, a terminal 128, to which a suitable utilizing device may be connected, is in turn connected to the lower end of coil 132 through a radio frequency choke coil 127 which is for the purpose of preventing the passage of radio frequency energy to the utilizing device. The arrangement shown in Figure 6 operates by virtue of the fact that in addition to the radio frequency field impressed between the outer electrodes 137, 139, there is also a direct current field produced by the battery 122. Thus, as the intermediate electrode 138 moves to and fro, due to the phase variations between the two energies impressed upon terminals 129, 130 and terminals 125, 126 respectively, it will take on varying direct current potentials corresponding to its displacement and hence to the modulation of the frequency modulated waves.

The arrangement shown in Figure 2 may be modified as shown in Figure 7 so as to produce audio frequency voltage. In Figure 7 the battery 143 produces a superposed direct current field through coil 148, thus coil 148 which corresponds to coil 32 of Figure 2, moves in response to modulation, similarly to coil 32 and generates audio frequency voltage by its motion through the direct current field component. This voltage may readily be separated out from the radio frequency voltage impressed upon the moving coil 148 by connecting one end of the coil 148 to terminal 156 through a choke 154 and the other end of coil 148 to terminal 155 through a choke 153. The audio frequency voltage is then available across terminals 155 and 156. Condensers 149 and 150 are provided so as to prevent the audio frequency voltage from being shorted by the connections to the respective windings 9 and 18 (Figure 1). If desired, an annular ring such as that shown at 34 (Figure 2) may be incorporated in the arrangement shown in Figure 7.

For example, the phase shifting arrangement of Figure 1 may be replaced not only by other equivalent schemes, but also may be replaced by more complex arrangements adapted to produce a larger change in relative phase of the input voltages to tubes 5 and 14 per unit change of frequency, while still providing the desired quadrature phase relation at the mean frequency. Such an arrangement is shown in my copending application, Serial No. 313,388, filed January 11, 1940.

Accordingly, it is to be pointed out that the present invention is not to be limited to the particular structure of the modifications shown and described but only by the scope of the appended claims.

What I claim is:

1. In a frequency modulation receiver, the method of detecting received frequency modulated waves which includes the steps of producing from the received energy two frequency modulated energies having the same frequency characteristics and a phase relation which varies from quadrature phase relation in accordance with deviations of the received energy from a predetermined frequency, combining the two energies and producing directly from said combination mechanical motion which is substantially proportional to the mean value of the scalar product of the two combined energies, and utilizing said motion to indicate said deviations.

2. The method described in claim 1 wherein the energy produced by the combination of said two energies is in the form of sound waves.

3. The method described in claim 1 wherein the energy produced by the combination of said two energies is in the form of an electric potential the value of which varies at substantially the same rate and to substantially the same extent as the frequency deviations of said received energy from the mean frequency.

4. In a frequency modulation receiver, means for intercepting transmitted frequency modulated waves, a transducer having a pair of input circuits, said transducer being arranged to produce directly from two radio frequency energies having similar frequency characteristics, output motional energy which is proportional to the mean value of the scalar product of the two input energies, a circuit including a phase shifting network intermediate said first named means and said transducer, said circuit being arranged to produce from the received energy, two frequency modulated energies having similar frequency characteristics and a phase relation which varies from quadrature phase relation in accordance with deviations of the received energy from the mean frequency, means for impressing one of said produced energies upon one of said input circuits and means for impressing the other produced energy upon the other of said input circuits whereby the output of said transducer includes energy which is proportional to the mean value of the scalar product of the two produced energies.

5. The arrangement described in claim 4 wherein one of said input circuits includes a coil provided with a core composed of ferro-magnetic material, and said other input circuit includes a second coil in coaxial relation with said first coil and telescoped over the center portion of said first coil, one of said produced energies being impressed between the center point and the two ends of said first coil, and said other produced energy being impressed across said second coil.

6. In a frequency modulation receiver, means for intercepting transmitted frequency modulated energy, a transducer having a field coil and a moving coil mounted in coaxial balanced relation, a phase shifting network having an input circuit and an output circuit, means for impressing the received energy across said moving coil and upon the input circuit of said phase shifting network, a pair of input terminals for said field coil one thereof being connected to the mid-point of the coil and the other to both ends of the field coil, and means for impressing the output of the phase shifting network across said input terminals, said phase shifting network being arranged to vary the phase of the energy impressed thereon so that the phase relation of the energies in said two coils varies from a predetermined phase relation at the mean frequency of the received energy in accordance with frequency deviations of the received energy from the mean frequency.

7. In a receiver as described in claim 4, a diaphragm connected with said moving coil and adapted to be displaced in accordance with movements of the moving coil.

8. In a frequency modulation receiver, means for intercepting a transmitted frequency modulated wave, a pair of substantially similar electrodes fixedly mounted adjacent to each other but in spaced relation, a network including a phase shifting means for producing from the received energy two frequency modulated energies having the same frequency characteristics and a phase relation which varies from quadrative phase relation in accordance with deviations of the received energy from the mean frequency, means for impressing one of the produced energies between said two fixed electrodes to thereby produce an electrostatic field therebetween, a movable electrode interposed between said fixed electrodes and in said field, and means for impressing the other produced energy upon said movable electrode.

9. The arrangement described in claim 8 wherein said movable electrode is in the nature of a diaphragm adapted to radiate sound waves in accordance with its movements.

10. In a frequency modulation receiver, means for intercepting frequency modulated waves, a transducer comprising a pair of parallel substantially planar electrodes fixedly mounted adjacent to each other but in spaced relation, a movable planar electrode mounted between said fixed electrodes in substantially parallel spaced relation with respect to each of said fixed electrodes, a circuit including an inductance coil for connecting one of said fixed electrodes to the other thereof, a second coil connected between said movable electrode and the mid-point of said first coil, a network including a phase shifting means for producing from the received energy two frequency modulated energies having the same frequency characteristics and a phase relation which varies from quadrature phase relation in accordance with deviations of the received energy from the mean frequency, means for impressing one of said energies upon said first coil in balanced relation with respect to said fixed electrodes and the mid-point of the coil, and means for impressing the other of said two energies upon the other coil.

11. The arrangement described in claim 10 wherein means are provided for resonating each of said coils at the mean frequency.

12. In a frequency modulation receiver, means for intercepting transmitted frequency modulated waves, means including a phase varying network for producing from the intercepted energy two energies of the same frequency and frequency modulated similarly to the intercepted energy and having a phase relation which varies from quadrature phase relation in accordance with deviations of the received energy from the mean frequency, a potential utilizing device, means for applying a potential thereto, and a control device interposed between said last named means and said second named means for varying the potential applied to said utilizing device in accordance with variations in the phase relation of said two energies.

13. In a frequency modulation receiver, the method of detecting received frequency modulated waves which includes the steps of producing from the received energy two frequency modulated energies having the same frequency characteristics and a phase relation which varies from quadrature phase relation in accordance with deviations of the received energy from the mean frequency, combining the two energies and producing directly from said combination motional energy which is substantially proportional to the mean value of the scalar product of the two combined energies.

14. A radio receiver comprising means for producing from received angular velocity-modulated carrier wave energy two modulated carrier energies having the same frequency characteristics but having a phase relation which varies from quadrature phase relation in accordance with deviations of the received energy from a predetermined frequency, means responsive to one of the two energies to provide a magnetic field, means, positioned in the magnetic field, responsive to the other of the two energies, and a device operatively associated with the last means for directly transforming motional displacements thereof into acoustic energy.

WALTER van B. ROBERTS.